(12) United States Patent  (10) Patent No.: US 8,251,290 B1
Bushman et al.  (45) Date of Patent: Aug. 28, 2012

(54) BAR CODE VALIDATION USING A WIRELESS COMMUNICATION DEVICE

(75) Inventors: Serge J. L. Bushman, Overland Park, KS (US); M. Jeffrey Stone, Overland Park, KS (US); Sharon T. Haubrich, Kansas City, MO (US); Ashwin Shashindranath, Overland Park, KS (US); Jeffrey Scott Barrington, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 965 days.

(21) Appl. No.: 12/043,239

(22) Filed: Mar. 6, 2008

(51) Int. Cl.
*G06K 7/10* (2006.01)

(52) U.S. Cl. ............. 235/462.01; 235/472.01; 235/384

(58) Field of Classification Search ............. 235/462.01, 235/472.01, 375, 384
See application file for complete search history.

(56) References Cited

U.S. PATENT DOCUMENTS

| | | | |
|---|---|---|---|
| 6,203,069 B1 | 3/2001 | Outwater et al. | |
| 6,264,106 B1 | 7/2001 | Bridgelall | |
| 6,513,017 B1 | 1/2003 | Howard et al. | |
| 6,816,075 B2 | 11/2004 | Grunes et al. | |
| 6,947,571 B1 | 9/2005 | Rhoads et al. | |
| 6,961,555 B1 | 11/2005 | Philyaw | |
| 6,993,573 B2 | 1/2006 | Hunter | |
| 7,068,170 B2 | 6/2006 | Green | |
| 7,121,469 B2 * | 10/2006 | Dorai et al. | 235/470 |
| 7,181,066 B1 * | 2/2007 | Wagman et al. | 382/183 |
| 7,190,835 B2 * | 3/2007 | Durbin et al. | 382/183 |
| 7,222,791 B2 | 5/2007 | Heilper et al. | |
| 7,274,931 B2 | 9/2007 | Harris | |
| 7,523,866 B2 * | 4/2009 | Longacre et al. | 235/462.25 |
| 7,634,065 B2 | 12/2009 | Fukunaga et al. | |
| 2001/0056359 A1 | 12/2001 | Abreu | |
| 2002/0052211 A1 | 5/2002 | Kim et al. | |
| 2002/0078363 A1 | 6/2002 | Hill et al. | |
| 2003/0156032 A1 | 8/2003 | Adams et al. | |
| 2003/0229678 A1 | 12/2003 | Wen et al. | |
| 2003/0233432 A1 | 12/2003 | Davis et al. | |
| 2004/0145613 A1 | 7/2004 | Stavely et al. | |
| 2004/0153553 A1 | 8/2004 | Chotkowski et al. | |

(Continued)

FOREIGN PATENT DOCUMENTS

EP  0645728  3/1995

(Continued)

OTHER PUBLICATIONS

Ron Schenone; "Self Checkout Grocery Scanners—A Shoplifter's Delight," The Blade by Ron Schenone, MVP; Jun. 28, 2007; 6 pages; http://www.lockergnome.com/nexus/blade/2007/06/28/self-check-out-grocery-scanners-a-shoplifters-delight/.

(Continued)

*Primary Examiner* — Ahshik Kim

(57) ABSTRACT

A wireless communication device optically receives and processes a bar code and a background item to the barcode to generate image data. A processing system processes the image data to identify a bar code portion of the image data and to identify a background portion of the image data. The processing system processes the barcode portion of the image data to generate decoded data. The processing system processes the background portion of the image data to generate background data. The processing system processes the decoded data and the background data to determine if the bar code is valid. The wireless communication device generates a bar code valid signal if the bar code is valid and generates a bar code invalid signal if the bar code is invalid.

25 Claims, 7 Drawing Sheets

U.S. PATENT DOCUMENTS

| | | | |
|---|---|---|---|
| 2005/0011957 | A1 | 1/2005 | Attia et al. |
| 2005/0029354 | A1 | 2/2005 | Frantz et al. |
| 2005/0044179 | A1 | 2/2005 | Hunter |
| 2005/0080681 | A1 | 4/2005 | Ohnishi |
| 2005/0173524 | A1* | 8/2005 | Schrader ............... 235/384 |
| 2006/0002591 | A1* | 1/2006 | Hombo ............... 382/115 |
| 2006/0020614 | A1 | 1/2006 | Kolawa et al. |
| 2006/0026048 | A1 | 2/2006 | Kolawa et al. |
| 2006/0042139 | A1 | 3/2006 | Mendes |
| 2006/0100925 | A1 | 5/2006 | Finaly |
| 2006/0212938 | A1 | 9/2006 | Suzuki |
| 2007/0061242 | A1 | 3/2007 | Ramer et al. |
| 2007/0061243 | A1 | 3/2007 | Ramer et al. |
| 2007/0061303 | A1 | 3/2007 | Ramer et al. |
| 2007/0083381 | A1 | 4/2007 | Farrell et al. |
| 2007/0133567 | A1 | 6/2007 | West et al. |
| 2007/0150588 | A1 | 6/2007 | Ghadialy et al. |
| 2007/0290045 | A1 | 12/2007 | Cisar |
| 2007/0290499 | A1 | 12/2007 | Tame |
| 2009/0086045 | A1 | 4/2009 | Giebel et al. |
| 2010/0041968 | A1 | 2/2010 | Meschisen et al. |

FOREIGN PATENT DOCUMENTS

| | | |
|---|---|---|
| JP | 2008090512 | 4/2008 |
| WO | WO-2006107610 | 10/2006 |

OTHER PUBLICATIONS

Teresa F. Lindeman; "Do-it-yourself Checkout Could Make Grocery Baggers a Thing of the Past;" Pittsburgh Post-Gazette; Apr. 26, 2005; 3 pages; Pittsburgh, Pennsylvania; http://www.post-gazette.com/pg/05116/494268.stm.

"EasyBarcodelabel 1.22;" Free Download Manager.com; Mar. 14, 2007; 2 pages; http://www.freedownloadmanager.org/downloads/EasyBarcodelabel_34766_p/.

Wendy Woods; "Safeway Offers Do-it-yourself Grocery Check-out;" Find Articles.com; Jun. 22, 1990; 3 pages; Landover, Maryland; http://64.233.167.104/search?q=cache:SRUvE08u1sMJ:findarticles.com/p/articles/mi_m0NEW/is_1990_June_26/ai_9423889+%22SAFEWAY+OFFERS+DO-IT-YOURSELF+GROCERY+CHECK-OUT+% 22&hl=en&ct=clnk&cd=1&gl=us.

Jan Harris, "Accelerometers Could Enhance Camera Phone Pictures," Camera Core, Mar. 23, 2007, 3 pages, camera-core.co.uk, http://www.camera-core.co.uk/23-03-2007-accelerometers-could-enhance-camera-phonespictures.html.

Jewels Et Jim, "Fashionable Medical I.D. Jewelry," May 8, 2008, 1 page, http://www.jewelsetjim.com/.

Livecycle, "Using Barcode Data in Processes," LiveCycle Workbench ES Help, Nov. 20, 2008, 3 pages, LiveCycle, ttp://livedocs.adobe.com/livecycle/es/wb_help/wwhelp/wwhimpl/common/html/wwhelp.htm? context=Workbench_ES&file=00001152.html.

PROJECTRESPONDER.COM, "Medical Alert Bracelet," May 8, 2008, 3 pages, http://www.projectrespondercom/medical-alert-bracelet~139.htm.

Pegasus Imaging Corporation, "Using Barcodes in Documents—Best Practices," Barcode Basics, 2007, pp. 1-9, Pegasus Imaging Corporation, http://www.pegasusimaging.com/BarcodesinDocuments-BestPractices.pdf.

Popular Electronics, "Apple Unlocked GSM Cell Phone," Nov. 21, 2008, 3 pages, Popular Electronics, http://www.popularelect.com/index.php?cPath=21_62.

Popular Electronics, "Nokia N82 Unlocked Quad Band GSM 5+ Megapixel Camera Cell Phone," Nov. 21, 2008, 3 pages, Popular Electronics, http://www.popularelect.com/product_info.php? products_id=875&osCsid=d9b4eb6c7150c354f9fc573c748b2c06.

Xiaoming Zhao, et al., "Integration of Information Technology, Wireless Networks, and Personal Digital Assistants for Triage and Casualty," Telemedicine and e-Health, Aug. 1, 2006, 2 pages, vol. 12, No. 4, Mary Ann Liebert, Inc., New Rochelle, New York, http://www.liebertonline.com/doi/abs/10.1089/tmj.2006.12.466?cookieSet=1&journalCode=tmj.

\* cited by examiner

BAR CODE VALIDATION USING A WIRELESS COMMUNICATION DEVICE

TECHNICAL BACKGROUND

A bar code may encode data that is related to an item. A bar code reader optically reads the bar code to generate image data. The bar code reader then processes the image data to decode the data related to the item. For example, a bar code that is attached to a product may encode a product identification, and the bar code reader reads and decodes the bar code to display the product identification.

In addition, a picture may be processed to derive data that uniquely identifies an item in the picture. For example, a camera takes a first picture of a person's face, and a processing system processes the first picture to derive unique data from the facial features. Subsequently, another camera takes a second picture of the person's face, and another processing system processes the second picture to derive the same unique data. In some applications, the two data sets are compared verify the identity of the person.

Overview

A wireless communication device optically receives and processes a bar code and a background item to the barcode to generate image data. A processing system processes the image data to identify a bar code portion of the image data and to identify a background portion of the image data. The processing system processes the barcode portion of the image data to generate decoded data. The processing system processes the background portion of the image data to generate background data. The processing system processes the decoded data and the background data to determine if the bar code is valid. The wireless communication device generates a bar code valid signal if the bar code is valid and generates a bar code invalid signal if the bar code is invalid.

In some examples, the processing system is integrated within the wireless communication device. In other examples, the processing system is remote from the wireless communication device. The processing system may be distributed among local and remote processing devices.

In the remote scenario, a wireless communication device optically receives and processes a bar code and a background item to the barcode to generate image data. The wireless communication device wirelessly transfers the image data to a communication system and a processing system receives the image data from the communication system. The processing system processes the image data to identify a bar code portion of the image data and to identify a background portion of the image data. The processing system processes the barcode portion of the image data to generate decoded data. The processing system processes the background portion of the image data to generate background data. The processing system processes the decoded data and the background data to determine if the bar code is valid. If the bar code is valid, the processing system transfers a bar code valid message to the communication system, and the wireless communication device wirelessly receives the bar code valid message from the communication system. The wireless communication device generates a bar code valid signal in response to the bar code valid message. If the bar code is invalid, the processing system transfers a bar code invalid message to the communication system, and the wireless communication device wirelessly receives the bar code invalid message from the communication system. The wireless communication device generates a bar code invalid signal in response to the bar code invalid message.

DETAILED DESCRIPTION

Figure 1:
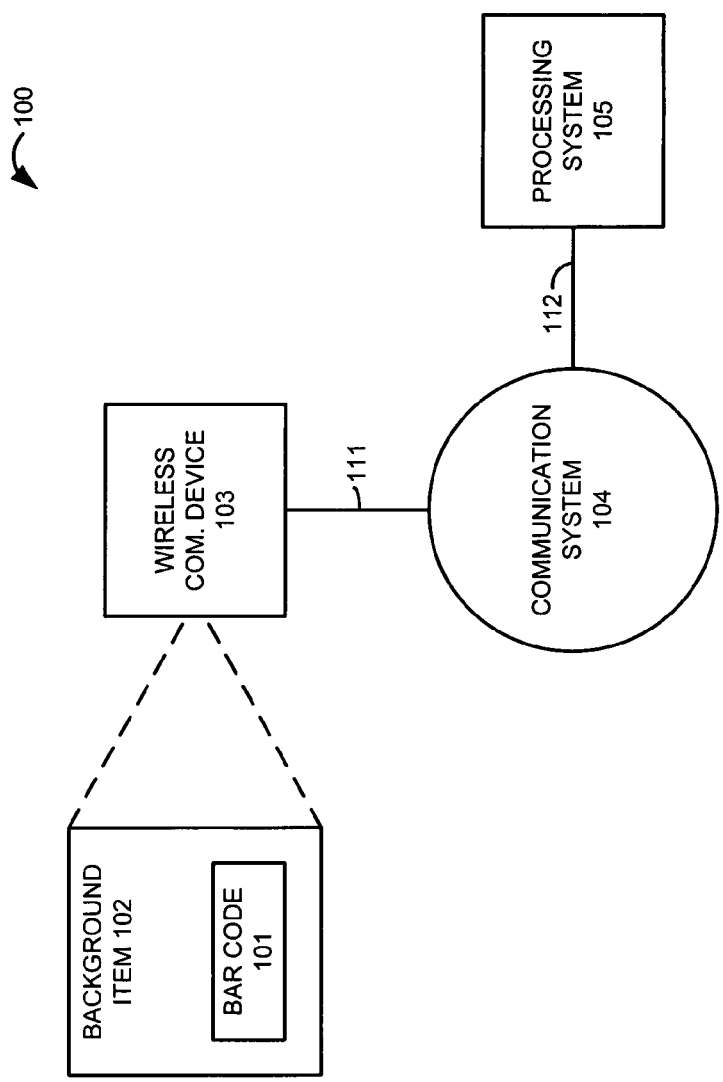
FIG. 1 is a block diagram that illustrates a bar code validation system.

FIG. 1 is a block diagram that illustrates bar code validation system 100. Bar code validation system 100 comprises wireless communication device 103 and processing system 105. Communication system 104 and wireless communication device 103 wirelessly exchange communications over wireless link 111. Communication system 104 and processing system 105 exchange communications over communication link 112. Thus, wireless communication device 103 and processing system 105 communicate over communication system 104 and links 111-112. As indicated by the dashed lines, wireless communication device 103 optically receives bar code 101 and at least a portion of background item 102.

Bar code 101 is attached or otherwise associated with background item 102. Bar code 101 could be a two-dimensional code. Examples of background item 102 include persons, products, video displays, structures, or scenery, although there are many other examples. Examples of products include televisions, computers, automobiles, business machines, appliances, and video game consoles, although there are many other examples. In some examples, bar code 101 is on imprinted an identity card that is carried by a person (background item 102), and the bar code indicates the persons identity and possibly other information, such as a security access level. In some examples, bar code 101 is on imprinted an tag attached to a product (background item 102), and the bar code indicates the product's identity and possibly other information, such as the product's cost.

Wireless communication device 103 comprises a telephone, transceiver, computer, digital assistant, Internet appliance, or some other wireless communication apparatus—including combinations thereof. Wireless communication device 103 has a camera or some other optical receiver. Wireless communication device 103 optically receives and processes bar code 101 and at least a portion of background item 102 to generate image data. For example, wireless communication device 103 may take a picture of bar code 101 and item 102, take a picture of bar code 101 and take a picture of item 102, collect video of bar code 101 and item 102, or perform some other form of optical reception.

The image data comprises an electrical representation of bar code 101 and the portion of background item 102. Wireless communication device 103 includes a user interface to indicate whether or not the bar code is valid. For example, wireless communication device 103 may display the words valid or invalid, display the colors green (valid) or red (invalid), generate the sounds beep (valid) or buzz (invalid), or provide some other validation signal. Wireless communication device 103 also includes a communication interface for wireless communication over communication system 104 and wireless link 111.

Communication system 104 comprises wireless access points, telephony switches, internet routers, network gateways, computer systems, communication links, or some other type of communication equipment—including combinations thereof. Wireless link 111 uses the air (or space) as the transport media. Wireless link 111 could use various protocols, such as wireless fidelity, code division multiple access, worldwide interoperability for microwave access, internet, telephony, or some other communication format—including combinations thereof. Communication link 112 uses various communication media, such as air, metal, optical fiber, or some other signal propagation path—including combinations thereof. Communication link 112 uses various protocols, such as internet, telephony, optical networking, wireless communication, wireless fidelity, code division multiple access, worldwide interoperability for microwave access, or some other communication format—including combinations thereof. Links 111-112 could be direct links or they might include various intermediate components, systems, and networks.

Processing system 105 comprises a computer system, such as a server and a database. Processing system 105 includes a communication interface for communication over communication system 104 and link 112. Processing system 105 stores (or has access to) validation files. The validation files associate specific decoded bar code data with specific background data. The decoded bar code data may indicate product identifications, person names, or some other information encoded into bar codes. The background data comprises identifying data that is derived from processing an image, such as a picture of a license plate or a human face.

Processing system 105 is configured to separate the image data into a bar code portion and a background portion. This separation could be accomplished by first identifying and removing the bar code portion from the overall image data and then treating the remainder of the image data as the background portion. The background portion may be further processed to isolate a particular background section, such as a person's face or a license plate number. Other image data separation techniques could be used.

Processing system 105 is configured to process the bar code portion of the image data to generate decoded bar code data. Processing system 105 is configured to process the background portion of the image data to generate background data. Processing system 105 is configured to process the decoded bar code data and the background data against the validation files to determine if the decoded bar code data is associated with the background data. If they are associated, then the bar code is valid, but if they are not associated, then the bar code is invalid.

For example, processing system 105 might decode a bar code into a Personal Identification Number (PIN) and process an image of a person's face to generate background data from the facial features of the person. Processing system 105 would then access the validation files with the PIN to retrieve identifying data from a previous picture of the person's face. Processing system 105 would compare the background data for the person's face with the identifying data for the PIN. If the background data adequately matches the identifying data from the validation files, then the bar code is valid.

Figure 2:
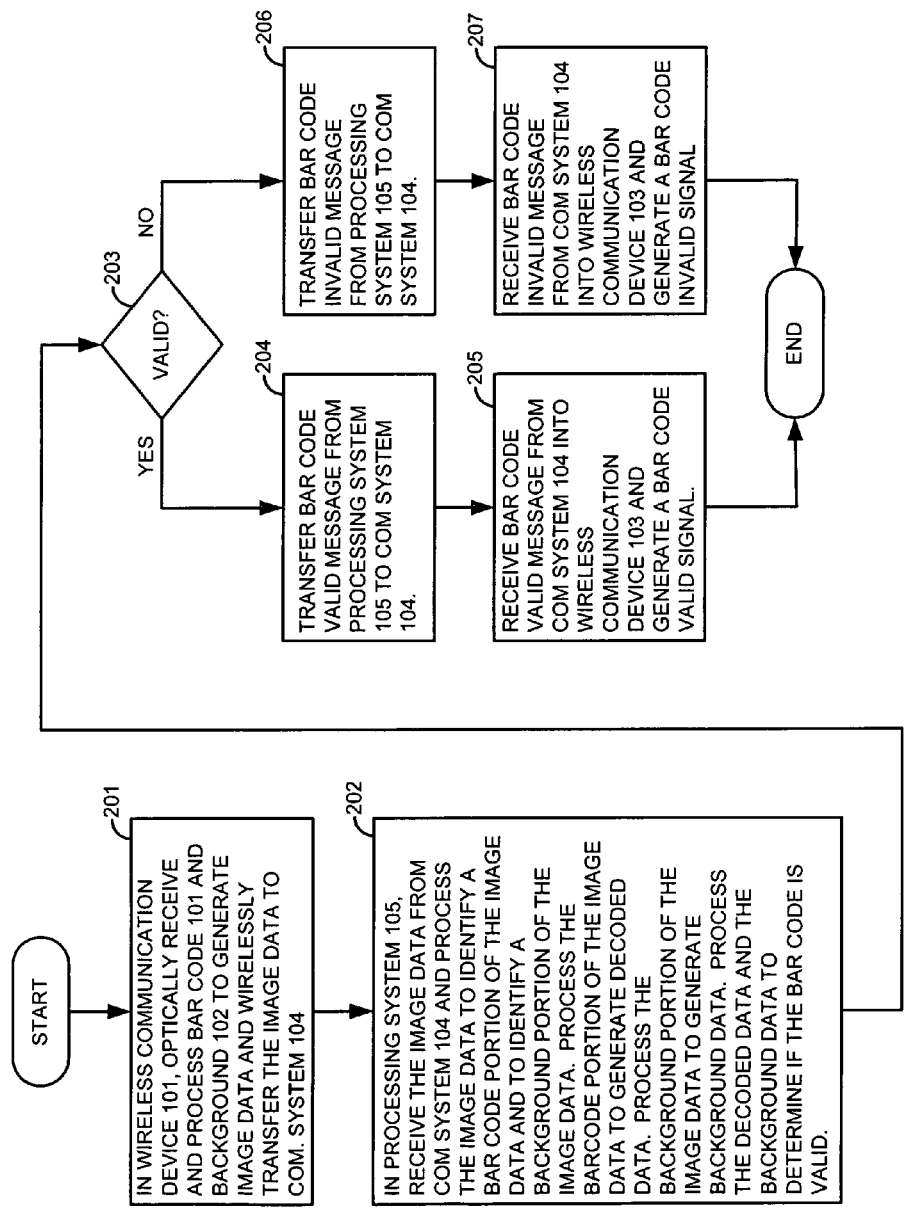
FIG. 2 is a flow diagram that illustrates the operation of the bar code validation system.

FIG. 2 is a flow diagram that illustrates the operation of bar code validation system 100. The operational sequence begins when wireless communication device 103 optically receives and processes bar code 101 and at least a portion of background item 102 to generate image data (201). Wireless communication device 103 wirelessly transfers the image data to communication system 104 over link 111 (201). Processing system 105 receives the image data from communication system 104 over link 112 (202).

Processing system 105 processes the image data to identify a bar code portion of the image data and to identify a background portion of the image data (202). Processing system 105 processes the barcode portion of the image data to generate decoded bar code data (202). Processing system 105 processes the background portion of the image data to generate background data (202). Processing system 105 processes the decoded bar code data and the background data to determine if the bar code is valid (202).

If the bar code is valid (203), processing system 105 transfers a bar code valid message to communication system 104 (204). Wireless communication device 103 wirelessly receives the bar code valid message from communication system 104 (205). Wireless communication device 103 generates a bar code valid signal in response to the bar code valid message (205). If the bar code is invalid (203), processing system 105 transfers a bar code invalid message to communication system 104 (206). Wireless communication device 103 wirelessly receives the bar code invalid message from communication system 104 (207). Wireless communication device 103 generates a bar code valid signal in response to the bar code valid message (207). The operational sequence ends.

Figure 3:
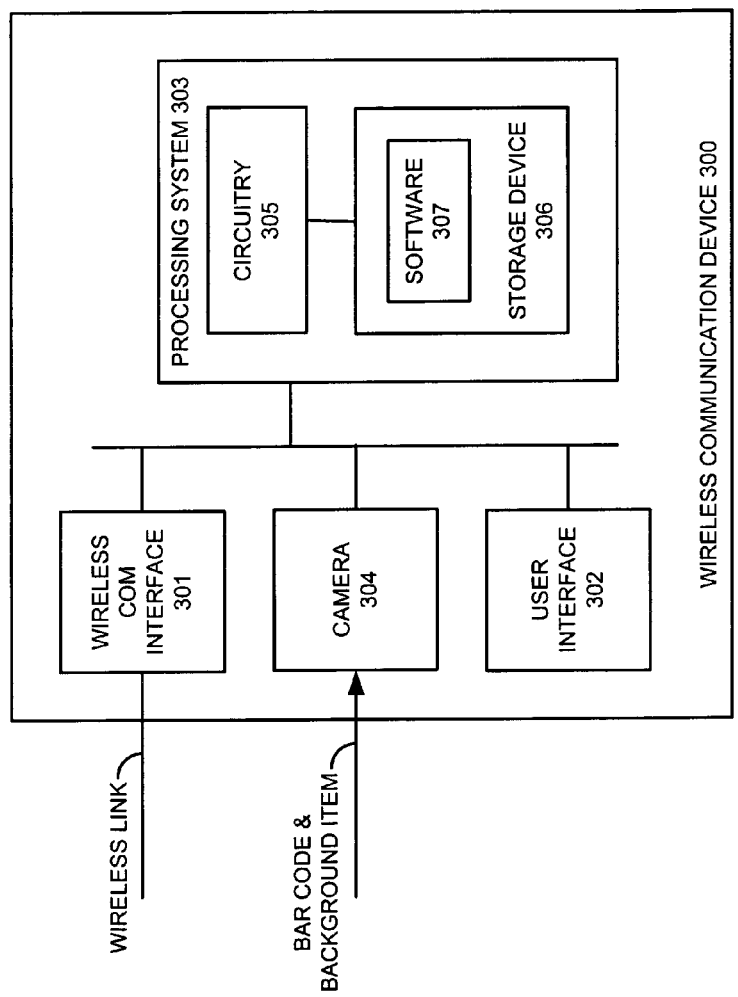
FIG. 3 is a block diagram that illustrates a wireless communication device that validates bar codes.

FIG. 3 is a block diagram that illustrates wireless communication device 300 that validates bar codes. Wireless communication device 300 comprises wireless communication interface 301, user interface 302, processing system 303, and camera 304. Processing system 303 is linked to wireless communication interface 301, user interface 302, and camera 304. Processing system 303 includes circuitry 305 and storage device 306 that stores operating software 307.

Wireless communication interface 301 comprises components that communicate over a wireless link under the control of processing system 303. Wireless communication interface 301 comprises a wireless transceiver and antenna or some other wireless communication device. User interface 302 comprises components that interact with the user under the control of processing system 303. User interface 302 may include a speaker, microphone, buttons, lights, display screen, touch screen, touch pad, scroll wheel, or some other user input/output apparatus. Circuitry 305 comprises microprocessor and other circuitry that retrieves and executes operating software 307 from storage device 306 to control wireless communication interface 301, user interface 302, and camera 304. Storage device 306 comprises a disk drive, flash drive, memory circuitry, or some other memory device.

Operating software 307 comprises computer programs, firmware, or some other form of machine-readable processing instructions. Operating software 307 may include an operating system, utilities, drivers, network interfaces, applications, or some other type of software. When executed by circuitry 305, operating software 307 directs processing system 303 to operate wireless communication device 103 as described herein. In particular, operating software 307 directs processing system 303 to perform image data processing as described above for processing system 105.

Camera 304 is configured to optically receive images of bar codes and their background items and transfer the received images to processing system 403. Camera 304 operates in response to instructions from processing system 303. For example, the user may provide camera instructions through user interface 302, and in response, processing system 303 would direct camera to optically receive a bar code and its background item. Camera 304 could be a wireless telephone camera or some other optical receiver.

Figure 4:
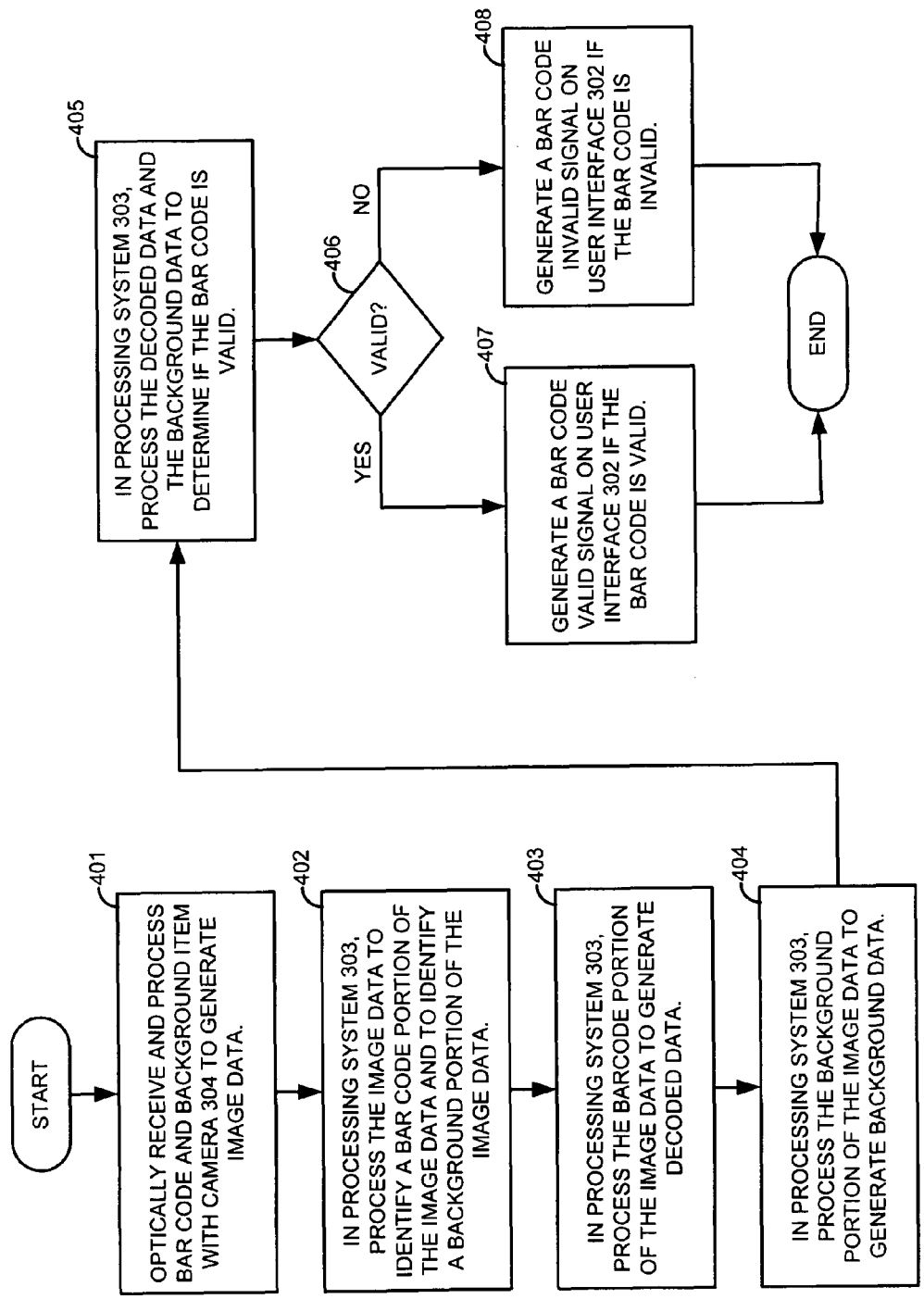
FIG. 4 is a flow diagram that illustrates the operation of the wireless communication device to validate bar codes.

FIG. 4 is a flow diagram that illustrates the operation of wireless communication device 300 to validate bar codes. The operational sequence begins when processing system 303 directs camera 304 to optically receive a bar code and at least a portion of a background item to generate image data (401). Processing system 303 processes the image data to identify a bar code portion of the image data and to identify a background portion of the image data (402). Processing system 303 processes the barcode portion of the image data to generate decoded bar code data (403). Processing system 303 processes the background portion of the image data to generate background data (404).

Processing system 303 processes the decoded bar code data and the background data to determine if the bar code is valid (405). To determine validation, wireless communication device 300 either stores or has access to validation files that associate specific decoded bar code data with specific background data. If the decoded bar code data is associated with the background data, then the bar code is valid (406), and processing system 303 directs user interface 302 to generate a bar code valid signal (407). If the decoded bar code data is not associated with the background data, then the bar code is invalid (406), and processing system 303 directs user interface 302 to generate a bar code invalid signal (408). The operational sequence ends.

Note that in the first operational sequence (FIG. 2), processing system 105 performed the image data processing, but in the second operational sequence (FIG. 4), processing system 303 performed the image data processing. Various distributions of image data processing between processing systems 105 and 303 could be used. For example, processing system 303 may perform some aspects of the image data processing, and processing system 105 may perform other aspects of the image data processing.

Figure 5:
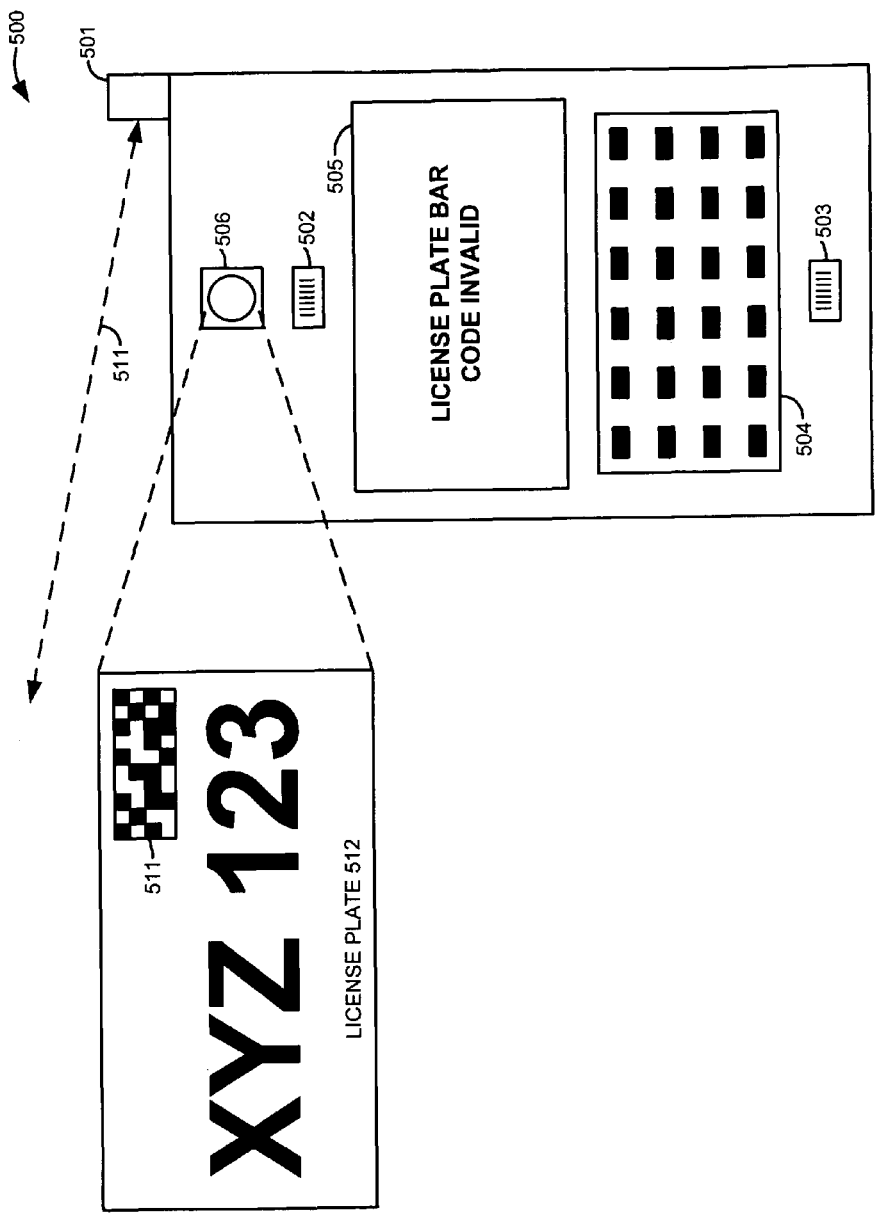
FIG. 5 is a sketch that illustrates a wireless telephone validating a bar code on a license plate.

FIG. 5 is a sketch that illustrates wireless telephone 500 performing license plate bar code validation. Wireless telephone 500 includes antenna 501, speaker 502, microphone 503, keypad 504, display 505, and camera 506. Wireless telephone 500 communicates over wireless link 511. Camera 506 optically receives and processes an image of two-dimensional bar code 511 and license plate 512 (the background item) to generate image data.

The image data is processed remotely or in wireless telephone 500 to determine if bar code 511 is valid. Bar code 511 is valid if the decoded bar code data is associated with the background data for license plate 512. The decoded bar code data could indicate a license plate number. The background data could be the number XYZ 123 from the license plate. In this case, someone has stolen bar code 511 from another car and placed it on license plate 512, so the decoded bar code data having the other person's license plate number does not match the background data of XYZ 123. Thus, bar code 511 is not associated with the number XYZ 123, and bar code 511 is invalid. In response, display 505 indicates that bar code 511 is invalid.

Figure 6:
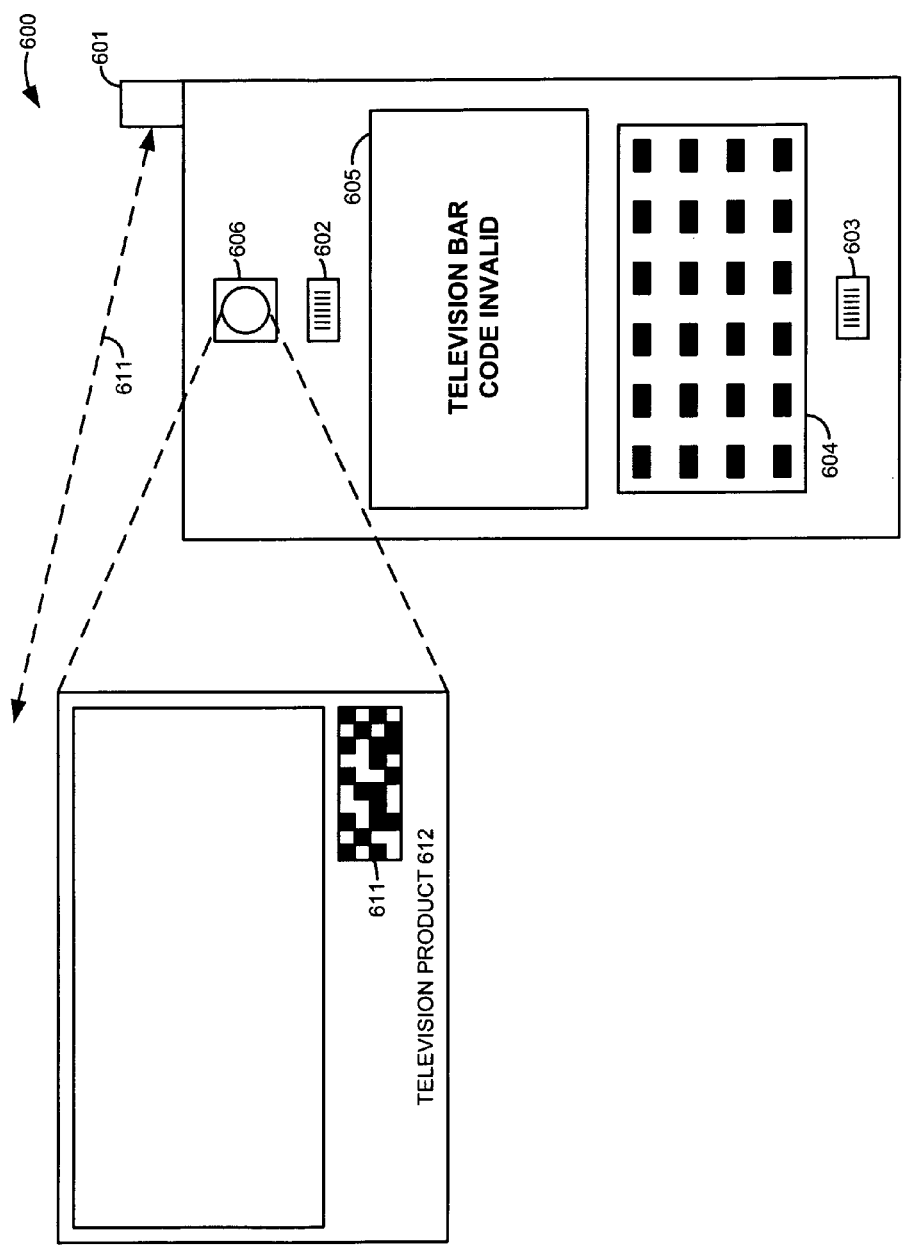
FIG. 6 is a sketch that illustrates a wireless telephone validating a bar code on a television product.

FIG. 6 is a sketch that illustrates wireless telephone 600 performing television product bar code validation. Wireless telephone 600 includes antenna 601, speaker 602, microphone 603, keypad 604, display 605, and camera 606. Wireless telephone 600 communicates over wireless link 611. Camera 606 optically receives an image of two-dimensional bar code 611 and television product 612 (the background item) to generate image data.

The image data is processed remotely or in wireless telephone 600 to determine if bar code 611 is valid. Bar code 611 is valid if the decoded bar code data is associated with the background data for television product 612. The decoded bar code data could indicate a product number and price. The background data could be identifying data derived from the size, color, and other features of television product 612. In this case, someone has stolen bar code 611 from a cheaper television and placed it on television product 612, so the decoded bar code data having the other television's product number and price is not associated with the identifying data derived from the image of the more expensive television. Thus, bar code 611 is not associated with the background data, and bar code 611 is invalid. In response, display 605 indicates that bar code 611 is invalid.

If desired, bar code 611 and the validation file could indicate the price of television product 612. The validation of bar code 611 would then entail verifying that the price indicated by bar code 611 is the same as the price associated with the background data for television product 612 in the validation file.

Figure 7:
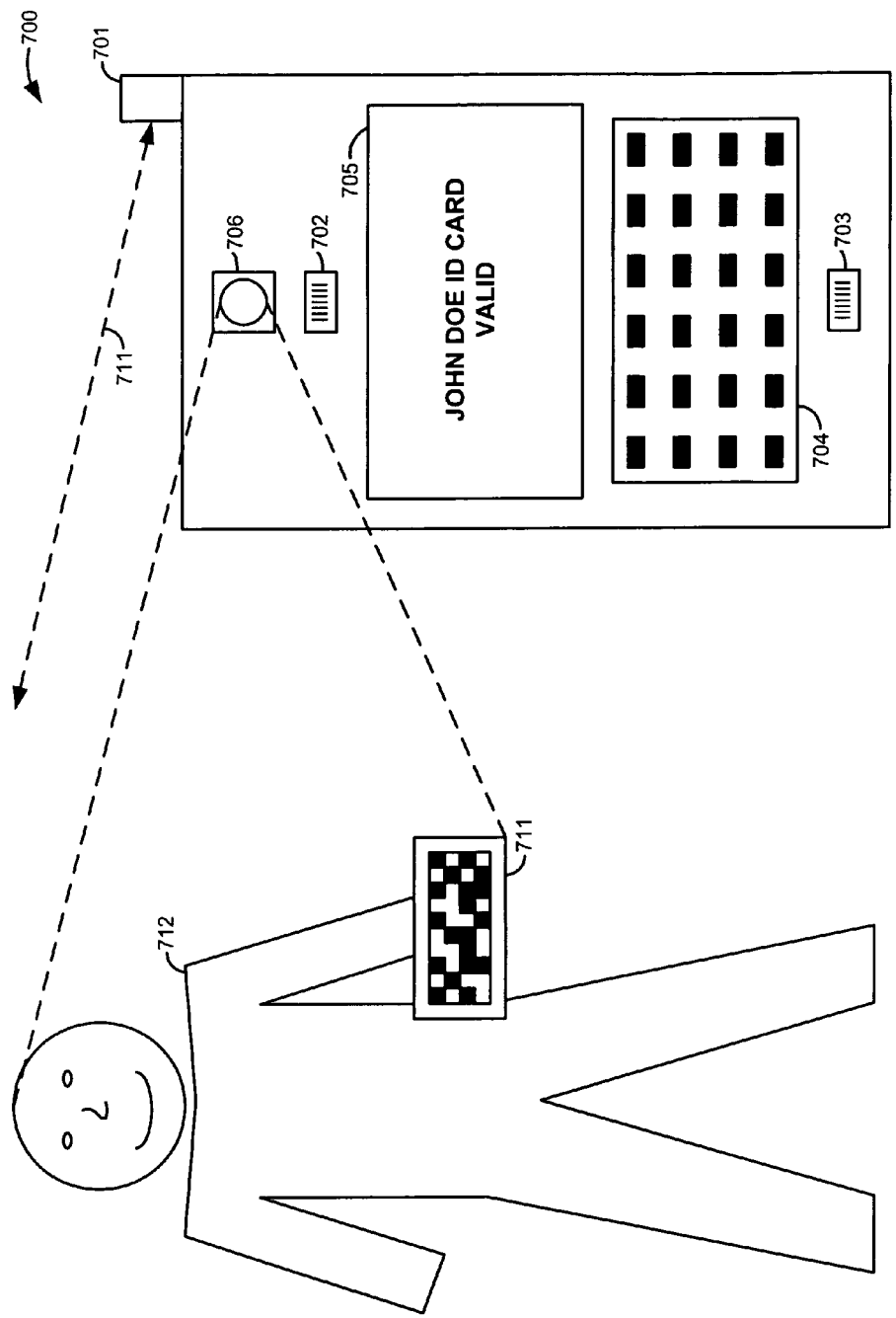
FIG. 7 is a sketch that illustrates a wireless telephone validating a bar code on a person's ID card.

FIG. 7 is a sketch that illustrates wireless telephone 700 performing ID card bar code validation. Wireless telephone 700 includes antenna 701, speaker 702, microphone 703, keypad 704, display 705, and camera 706. Wireless telephone 700 communicates over wireless link 711. Camera 706 optically receives an image of two-dimensional bar code 711 and the face of person 712 (the background item) to generate image data.

The image data is processed remotely or in wireless telephone 700 to determine if bar code 711 is valid. Bar code 711 is valid if the decoded bar code data is associated with the background data for the face of person 712. In this case, the decoded bar code data is the PIN for person 712. The PIN is associated with identifying data derived from a previous picture of the face of person 712. Since the identifying data retrieved with the PIN adequately matches the background data for the face of person 712, bar code 711 is valid. In response, display 705 indicates that bar code 711 on the ID card for person 712 is valid.

Although the examples described above for FIGS. 5-7 use wireless telephones, other wireless communication devices could be used in a similar manner.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of validating a bar code, the method comprising:
   in a wireless communication device, optically receiving and processing a bar code and a background item to the barcode to generate image data;
   in the wireless communication device, transferring the image data to a processing system;
   in the processing system, processing the image data to identify a bar code portion of the image data and to identify a background portion of the image data;
   in the processing system, processing the barcode portion of the image data to generate decoded data;
   in the processing system, processing the background portion of the image data to generate background data;
   in the processing system, processing the decoded data and the background data to determine if the bar code is valid;

in the processing system, transferring a bar code valid message to the wireless communication device if the bar code is valid;

in the processing system, transferring a bar code invalid message to the wireless communication device if the bar code is invalid;

in the wireless communication device, in response to receiving the bar code valid message, generating a bar code valid signal;

in the wireless communication device, in response to receiving the bar code invalid message, generating a bar code invalid signal if the bar code is invalid.

2. The method of claim 1 wherein the bar code is attached to a license plate having a license number and the background item to the barcode includes the license number.

3. The method of claim 1 wherein the bar code identifies a retail product and the background item to the barcode includes at least a portion of the retail product.

4. The method of claim 1 wherein the bar code identifies a price of a retail product and the background item to the barcode includes at least a portion of the retail product.

5. The method of claim 1 wherein the bar code is held by a person and the background item to the barcode includes a face of the person.

6. The method of claim 1 wherein the bar code comprises a two-dimensional bar code.

7. The method of claim 1 wherein the wireless communication device comprises a wireless telephone having a camera.

8. The method of claim 1 wherein the processing system is integrated within the wireless communication device.

9. The method of claim 1 wherein the processing system is remote from the wireless communication device and wherein the image data, the bar code valid message, and the bar code invalid message are transferred through a communication system.

10. The method of claim 9 wherein the bar code is attached to a license plate having a license number and the background item to the barcode includes the license number.

11. The method of claim 9 wherein the bar code identifies a retail product and the background item to the barcode includes at least a portion of the retail product.

12. The method of claim 9 wherein the bar code identifies a price of a retail product and the background item to the barcode includes at least a portion of the retail product.

13. The method of claim 9 wherein the bar code is held by a person and the background item to the barcode includes a face of the person.

14. The method of claim 9 wherein the bar code comprises a two-dimensional bar code.

15. The method of claim 9 wherein the wireless communication device comprises a wireless telephone having a camera.

16. A validation system for a bar code comprising:

a wireless communication device configured to optically receive and process a bar code and a background item to the barcode to generate image data, transfer the image data to a processing system, generate a bar code valid signal in response to receiving a bar code valid message, and generate a bar code invalid signal in response to receiving a bar code invalid message;

the processing system configured to process the image data to identify a bar code portion of the image data and to identify a background portion of the image data, process the barcode portion of the image data to generate decoded data, process the background portion of the image data to generate background data, process the decoded data and the background data to determine if the bar code is valid, transfer the bar code valid message to the wireless communication device if the bar code is valid, and transfer the bar code invalid message to the wireless communication device if the bar code is invalid.

17. The validation system of claim 16 wherein the bar code is attached to a license plate having a license number and the background item to the barcode includes the license number.

18. The validation system of claim 16 wherein the bar code identifies a retail product and the background item to the barcode includes at least a portion of the retail product.

19. The validation system of claim 16 wherein the bar code identifies a price of a retail product and the background item to the barcode includes at least a portion of the retail product.

20. The validation system of claim 16 wherein the bar code is held by a person and the background item to the barcode includes a face of the person.

21. The validation system of claim 16 wherein the bar code comprises a two-dimensional bar code.

22. The validation system of claim 16 wherein the wireless communication device comprises a wireless telephone having a camera.

23. The validation system of claim 16 wherein the processing system is integrated within the wireless communication device.

24. The validation system of claim 16 wherein the processing system is remote from the wireless communication device and wherein the image data, the bar code valid message, and the bar code invalid message are transferred through a communication system.

25. The validation system of claim 24 wherein the wireless communication device comprises a wireless telephone having a camera.

* * * * *